W. S. RODERICK & A. J. WARNER.
COTTON CHOPPER.
APPLICATION FILED DEC. 20, 1911.
1,056,123.
Patented Mar. 18, 1913.
2 SHEETS—SHEET 1.
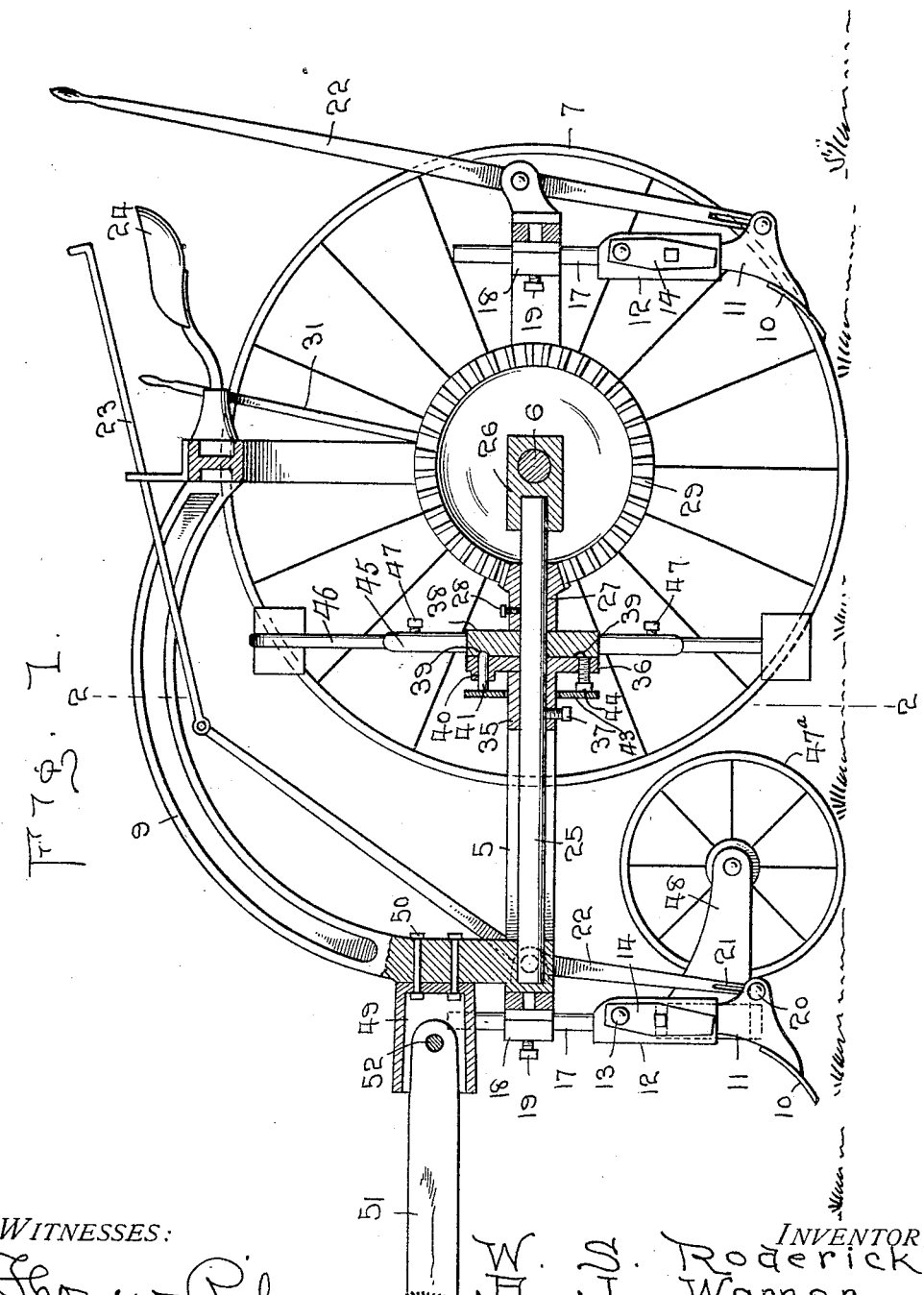
WITNESSES:
INVENTORS
W. S. Roderick
A. J. Warner
BY
W. T. Fitzgerald Co.,
Attorneys

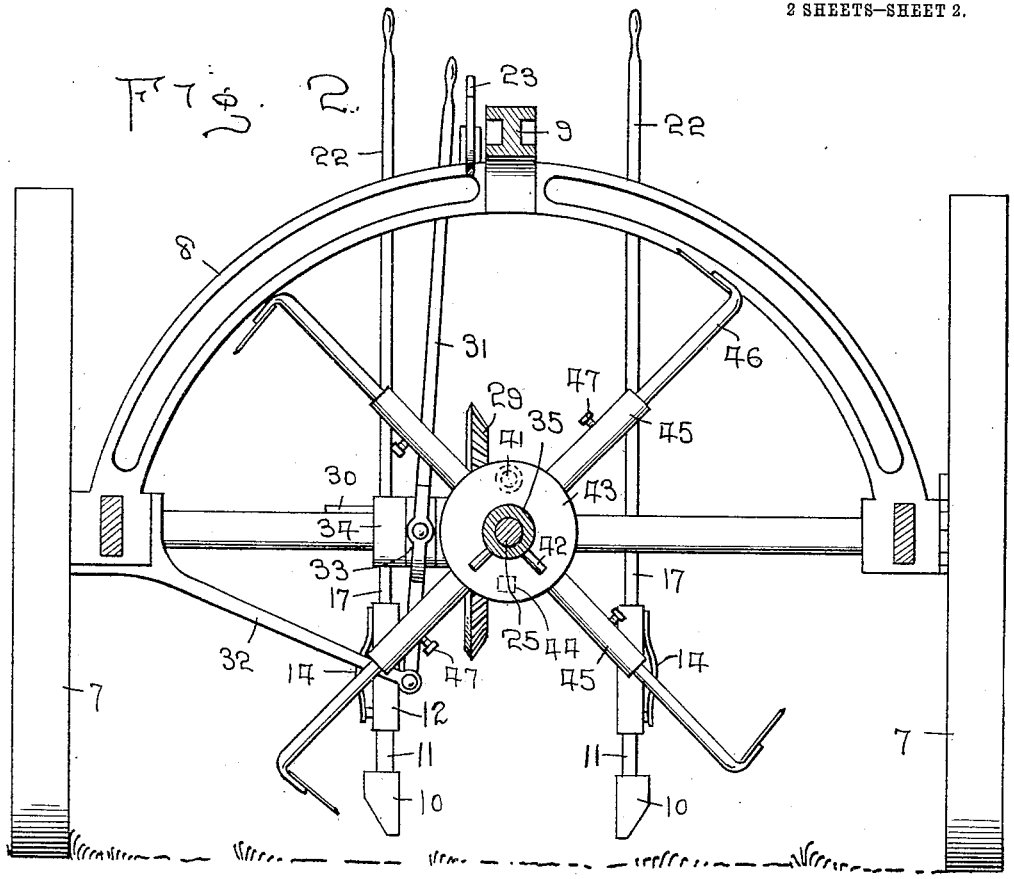
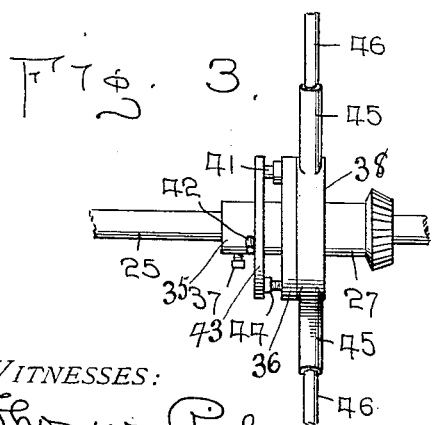
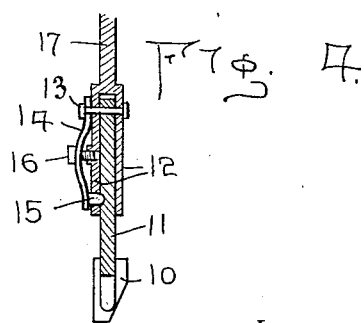

UNITED STATES PATENT OFFICE.

WILLIAM S. RODERICK AND ANDREW J. WARNER, OF DURHAM, NORTH CAROLINA.

COTTON-CHOPPER.

1,056,123.  Specification of Letters Patent.  Patented Mar. 18, 1913.

Application filed December 20, 1911. Serial No. 666,906.

*To all whom it may concern:*

Be it known that we, WILLIAM S. RODERICK and ANDREW J. WARNER, citizens of the United States, residing at Durham, in the county of Durham and State of North Carolina, have invented certain new and useful Improvements in Cotton-Choppers; and we do hereby declare the following to be a full, clear, and exact description of the invention, such as will enable others skilled in the art to which it appertains to make and use the same.

Our invention relates to new and useful improvements in cotton choppers and particularly to a device adapted to be used in the cultivation of cotton.

The object of our invention is to provide a device having means for working the soil adjacent rows of cotton plants.

A further object of our invention is to provide cotton choppers for automatically thinning rows of cotton, and, a further object of our invention is to so construct our device that the chopper blades may be moved out of operative position when meeting an obstruction.

Other objects and advantages will be hereinafter made clearly apparent in the specification and pointed out in the claims.

In the accompanying drawings we have shown the preferred form which our invention may take.

In said drawings, Figure 1 is a longitudinal sectional view through our device. Fig. 2 is a transverse sectional view therethrough. Fig. 3 is a side elevation showing our preferred form of clutch mechanism for the chopper members, and, Fig. 4 is a vertical sectional view through one of the chopper blades and holding means therefor.

Referring to the drawings in which similar reference numerals designate corresponding parts throughout the several views, 5 is a substantially rectangular supporting frame adapted to carry the parts of our device, in which is rotatably mounted a driving shaft 6, to the ends of which are secured driving and supporting wheels 7.

An auxiliary frame 8 in the shape of an upwardly extending semicircular arch, has its ends connected to the main frame at points adjacent said axle and an auxiliary frame 9 also in the form of an upwardly extending semi-circular arch has one end connected to the upper portion of the frame 8 and its forward end connected to the center portion of said frame 5. Secured to the forward and rear ends of said supporting frame are pairs of cultivating plows 10, which are rigidly secured to plow holders 11. The plow holders 11 are preferably substantially rectangular in cross section and pivotally mounted in a housing 12, which is substantially U-shaped in cross section, the open end of said housing being rearwardly directed. Secured to the side of said housing, by means of a bolt 13 or other desired manner, is a spring 14, the lower end of said spring bearing against or carrying a pin 15, which extends through one side of the housing. The inner end of the pin 15 is rounded and is adapted to normally rest in a semicircular seat formed in one side of the plow holder 11. In order that the pressure of the spring 14 upon said pin 15 may be increased or decreased, a bolt 16 is extended through the central portion of said spring, said bolt being screw threaded and adapted to take into a screw threaded seat in one side of the housing. By adjusting the bolt 16, pressure of the spring upon the pin may be regulated. By this construction it will be seen that should one of the plows meet with an obstruction such as a large stone, stump, etc., the pressure exerted upon the end of the plow would cause the pin 15 to be forced out of its seat to allow the plow holder to move upon its pivot, thus allowing the plow to ride over the obstruction.

The upper end of the housing 12 has rigidly secured thereto an upwardly extending stem or rod 17, which passes through a housing 18 secured to the transverse portion of the frame 5. The stem 17 is movable vertically in said housing 18 so that the depth to which the plows 10 will work may be regulated. When the plows 10 have been adjusted so as to work to a predetermined depth, a set screw 19 extending through the housing 18 is turned so as to clamp the stem 17 in the desired position.

In order that the plow after passing over an obstacle may be again moved into operative position, the rear of each plow holder is provided with a pin 20, which is adapted to take into a slot 21 formed in one end of a lever 22. The levers 22, for operating the forward pair of cultivator plows, are pivotally secured between their ends to the forward portion of the frame 5 and the upper end of said levers are pivotally secured to operating rods 23, which are extended rearwardly to a point adjacent the operator's seat 24. The operator's seat 24 is preferably secured to the auxiliary frame 8. The pair of plows 10 secured to the rear portion of the frame 5 have their operating levers 22 extended to convenient points adjacent the operator's seat.

In order that a row of cotton may be thinned at intervals, we provide chopper members, which will remove the cotton plants at intervals in the row. Arranged longitudinally of the center of the frame is a shaft 25, which has its forward end journaled in the forward end of the frame and its rear end journaled in a bearing block 26.

As seen in Fig. 1 the shaft 25 is arranged in the same horizontal plane as the shaft 6, and the bearing block 26 is provided with a transverse bore to receive said shaft 6. A bevel gear 27 is secured by means of a set screw 28, or in other desired suitable manner, to the shaft 25 and is adapted when the machine is in operation to mesh with a bevel gear 29 carried by the shaft 6. The gear 29 is caused to move with said shaft 6 by means of the rib 30, which is preferably formed integrally with said shaft, but may be moved longitudinally of said shaft by means of the lever 31. The lever 31 is pivoted at its lower end to a bracket 32 extending from one side of the frame and said lever is also pivotally secured intermediate its ends to a collar 33. The collar 33 fits in a groove formed in a sleeve 34 formed integrally with said gear 29. By this means the gear 29 may be moved into or out of mesh with said gear 27. Also rigidly secured to the shaft 25 is a sleeve 35 provided at one end with a radial flange 36. The sleeve 35 is secured in place by means of a set screw 37. The flange 36 is spaced a slight distance from the ends of the bevel gear 27 and a disk or hub 38 is rotatably mounted therebetween. Said disk 38 is provided, upon the side adjacent said flange 36, with a plurality of depressions 39, for a purpose hereinafter more clearly set forth.

The flange 36 is provided at one point with a horizontally extending bore 40, through which a pin 41 is adapted to extend. The inner end of said pin 40 is rounded and adapted to be normally seated in one of the depressions 39, for a purpose hereinafter more clearly set forth. In order that the pin 41 may be normally seated in one of the depressions 39, we provide the sleeve 35 with a pair of radially extending pins 42. The pins 42 are arranged at right angles to one another and upon the opposite side of the sleeve from said pin 41. A disk 43 is loosely disposed upon the sleeve 35 and between the pins 42 and the pin 41. The flange 36 is also provided, at a point diametrically opposite the location of the pin 41, with an internally threaded bore, in which is adapted to be seated a set screw or bolt 44. By rotating said set screw in the proper direction, the disk 43 will be forced against the pins 42 and the upper end of said disk will engage the outer end of the pin 41 to hold said pin in place. The disk 43 is formed of spring material and will hold the pin 41 under tension. By regulating the set screw 44 the amount of tension under which the pin 40 is held may be regulated.

The disk or hub 38 is provided with a plurality of radially extending arms 45. In the drawing we have shown said hub or disk provided with four arms, but it will be understood that the number of arms may be changed, as desired. Each arm 45 is provided with a longitudinal bore adapted to receive the shank of the chopper member or cultivator hoe 46. Each hoe 46 is positioned in its arm 45 so that in operation the cultivator blade on the end thereof will work to the desired depth and the hoe is then clamped in such position by means of set screw 47. By changing the size of the cultivating hoes 46, the number of plants cut down by each hoe may be increased or decreased, as desired.

When the machine is in operation and one of the hoes 46 comes into engagement with an obstacle such as a stone or stump, the sleeve 35 will continue to rotate and the pin 41 will be forced out of the depression and allow the hub 38 to remain stationary relative to the sleeve and shaft 25 until said pin is seated in the succeeding depression, by which time the forward movement of the machine will cause the hoes to clear the stone, stump or other obstruction. In order that the forward end of the frame may be supported, a wheel 47$^a$ is pivotally secured in a frame 48, which in turn is pivotally secured to the forward portion of said frame 5. In order that the machine may be pulled over the ground we secure to the forward end of the auxiliary frame 9, or to some other suitable position, a housing 49. As shown in the drawing the housing 49 is cup shaped and has its base secured to said frame 9 by means of bolts 50. A tongue 51 has its rear end extended into the housing 49 and is secured therein by a transversely extending bolt 52. When it is desired the gears 27 and 29 may be reversed so that the speed of rotation of the drum 38 may be changed.

From the foregoing it will be seen that we have provided a device whereby plants may be cultivated and thinned to the desired degree. It will also be seen that we have provided means whereby breakage of the cultivating plows and chopping hoes will be prevented.

While we have described our invention as particularly adapted for use in the cultivation of cotton, we desire it to be understood that the same may be used for the cultivation and thinning of any other kind of plant. We also desire it to be understood that certain modifications may be made in our device as shown, without departing from the spirit and scope of our invention.

What we claim as new is:

1. In a cotton chopper a horizontal and rotatable shaft, a hub rotatably mounted on the shaft and carrying cultivator blades, said hub having a depression in one end thereof, a flanged sleeve fixed to the shaft and having an aperture through the flange, a pin extending through the aperture and adapted to engage the depression, and spring means to normally hold said pin in engagement with said depression.

2. In a cotton chopper, a horizontal and rotatable shaft, a hub rotatably seated on the shaft and carrying cultivator blades, a flanged sleeve fixed on the shaft and having an aperture through the flange, said hub having spaced depressions adapted to register alternatively with said aperture, a pin movably seated in the aperture and adapted to alternatively engage and to disengage the depressions in the hub, a spring disk surrounding said sleeve and exerting a pressure upon said pin and means associated with the sleeve and with the flange thereof for holding said pin normally in one of the depressions, the last said means embracing means for adjusting the pressure of the spring disk upon the pin.

3. In a cotton chopper a horizontal and rotatable shaft, a hub rotatably mounted on the shaft and carrying cultivator blades, said hub having a depression in one end thereof, a flanged sleeve fixed to the shaft and having an aperture through the flange, a pin movably seated in said aperture and normally adapted to extend into said depression, a spring disk surrounding said sleeve and having one side engaging the outer end of said pin, a stop on said sleeve to limit the movement of said disk, and a stop adjustably engaging said flange and the side of said disk opposite said pin whereby the pressure of said disk upon said pin may be varied.

In testimony whereof we have signed our names to this specification in the presence of two subscribing witnesses.

WILLIAM S. RODERICK.
ANDREW J. WARNER.

Witnesses:
K. P. Lewis,
P. E. Moran.

---

Copies of this patent may be obtained for five cents each, by addressing the "Commissioner of Patents, Washington, D. C."